Aug. 26, 1952 — F. G. CUESTA — 2,608,230
PNEUMATIC BALLOON TIRE
Filed June 25, 1947 — 2 SHEETS—SHEET 1
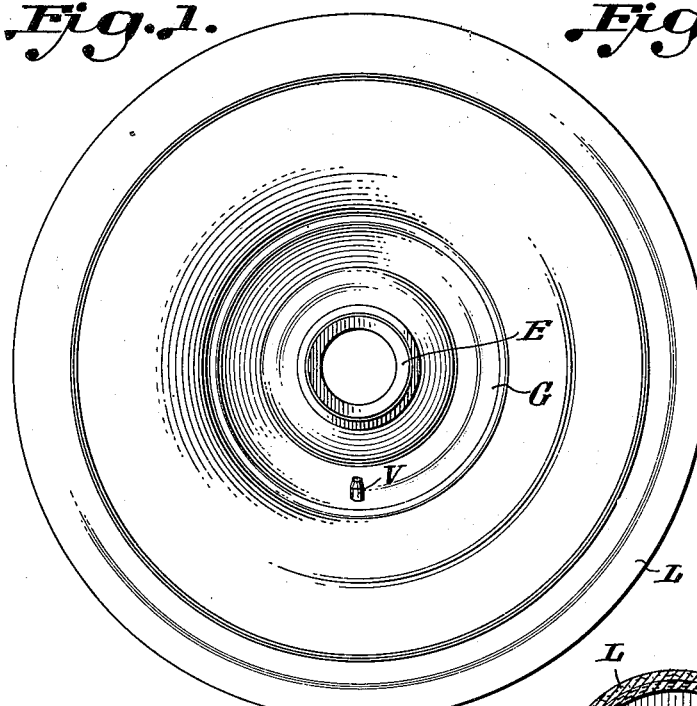
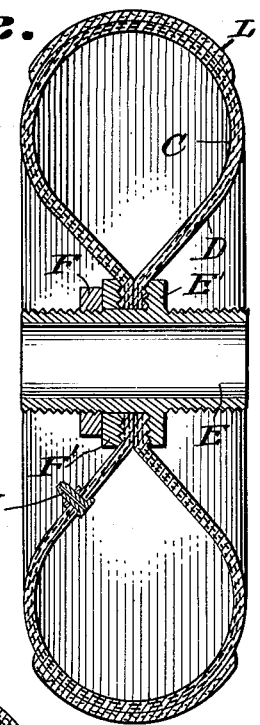
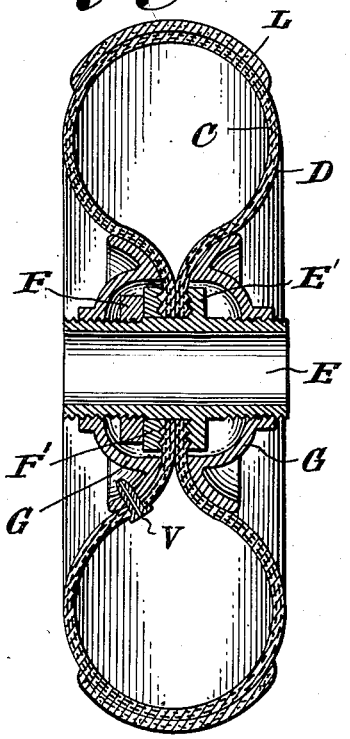
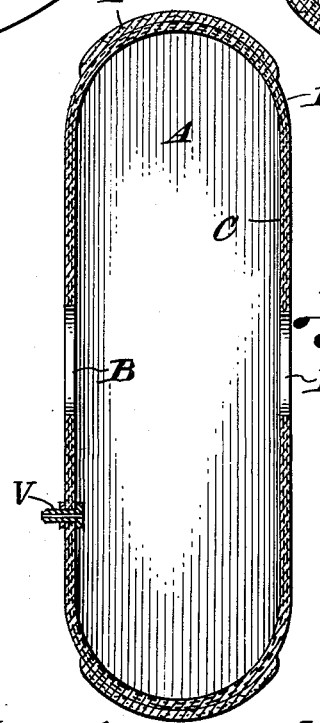
INVENTOR
Francisco Gonzalez Cuesta,
BY Wenderoth, Lind & Ponack
ATTORNEYS INVENTOR
Francisco Gonzalez Cuesta, Patented Aug. 26, 1952

2,608,230

UNITED STATES PATENT OFFICE 2,608,230

PNEUMATIC BALLOON TIRE

Francisco Gonzalez Cuesta, San Sebastian, Spain

Application June 25, 1947, Serial No. 756,957
In Great Britain September 27, 1946

4 Claims. (Cl. 152—9)

This invention relates to pneumatic balloon-tire wheels for vehicles and aircraft, and has for its object to provide an improved construction of balloon-tire wheel which is comparatively inexpensive in production and in which the tire is capable of being applied and removed with a minimum of physical effort and without the necessary use of fitting tools or levers such as are required in connection with pneumatic tires of the kind hitherto employed.

According to the present invention, the pneumatic balloon-tire wheel for vehicles and aircraft comprises an airtight envelope which is sealed by pressing oppositely disposed apertured central parts together to provide a balloon tire which does not require an independent inner tube.

The invention furthermore includes a pneumatic balloon-tire wheel for vehicles and aircraft comprising a hollow balloon of substantially disc-like formation with two opposite central apertures, said balloon being made of layers of fibrous material, woven or otherwise cemented together and provided with an internal layer or coating of rubber or other plastic material impermeable to air.

The sealing of the balloon is effected by means of a threaded metallic element introduced through the oppositely disposed central apertures and provided with a nut whereby the opposite central parts of the balloon may be pressed together. Furthermore, in accordance with the invention, discs or plates of suitable shape are applied to opposite sides of the sealed balloon to shape the outer part of the tire to a substantially tubular form, said discs or plates being connected by the threaded metallic element by which the sealing of the tire is effected. The balloon may be covered externally with a coating or layer of rubber or other material to protect it against wear and weather and may have a thickened layer or reinforcement of rubber or the like at the tread portion.

The fibrous layers of which the balloon is constructed may comprise fibres or strands arranged to extend in spirals from the central apertures and in alternate or successive layers the spirally arranged fibres or strands may be disposed to cross.

Owing to the relatively large air capacity of the improved pneumatic tire wheel according to the invention the running of a vehicle to which it is fitted is rendered more smooth and the tire is less liable to break down due to punctures or ruptures as it is well known that a large volume of air at low pressure is equivalent to a small volume at high pressure, as regards its weight carrying capacity, the use of a relatively low pressure greatly minimising the risk of deflation resulting from puncture or the like.

A further advantage resulting from the use of the improved wheel is that, more especially for use with light vehicles, it renders unnecessary the provision of an independent inner tube, such as is usually employed.

The invention is hereinafter described by way of example with reference to the accompanying diagrammatic drawings, in which:

Fig. 1 is a side elevation illustrating one construction of the improved wheel according to the invention;

Fig. 2 is a diametrical section corresponding to Fig. 1 before the application of the side discs;

Fig. 3 is a view similar to Fig. 2 showing the complete wheel;

Fig. 4 is a diametrical section of the balloon tire.

Referring to the accompanying diagrammatic drawings, the improved balloon-tire wheel comprises a balloon A (Fig. 4) of substantially disc-like form having two opposite central apertures B which preferably are sufficiently large to permit the introduction of the hand for the application of patches in the event of puncture, it being necessary to effect such repairs internally because if patches were applied externally they would be liable to become detached due to friction on the ground.

Figure 5:
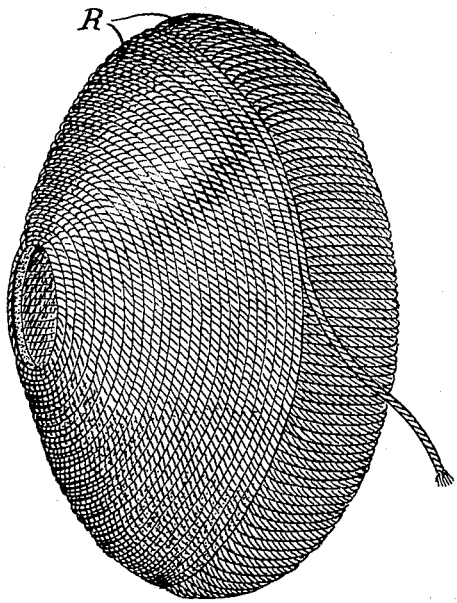
Fig. 5 is a perspective view of a tire composed of fibrous layers of material.
Figure 6:
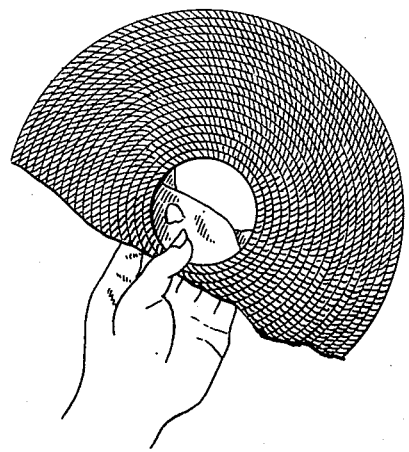
Fig. 6 is a side elevation of the tire of Fig. 5 showing its adaptability for interior inspection.

The balloon A may be constructed of several layers of fibrous material R, such as cotton, woven or otherwise, the layers being cemented together and vulcanized as shown in Figs. 5 and 6. The interior of the balloon is provided with a layer or coating C of rubber or other elastic material which is impermeable to air under pressure, and the exterior also may be covered with a layer or coating D of rubber or the like to protect it against the weather and to reduce wear and tear. A thickened rubber or like reinforcement L is provided at the tread portion and a suitable valve V (Fig. 2) is provided for inflation.

The sealing of the balloon is effected by introducing a threaded metallic element E through the opposite central apertures B and applying a nut F by which the central parts of the balloon round the apertures B are pressed together between a flange E' on the element E and a washer F". For additional security the oposing faces of the flange E' and the washer F" may be circumferentially ribbed.

When the balloon is sealed, as shown in Fig. 2, discs or plates G are applied in position one at each side, as shown in Fig. 3, such discs or plates G being suitably shaped, as shown, to form the external part of the tire to a tubular shape. The plates G conveniently are connected together by means of the threaded element E and are also shaped so as to provide a housing for the flange E', the washer F' and the lock nut F.

When the plates G are in position, air is injected through the valve V which projects through a hole in one of the plates G. The wheel is applied on the shaft or the axle of the vehicle, being fixed by the central part or closure element by means of nuts or other suitable means.

As can be seen from Fig. 5 of the drawings the fibers in different superimposed layers cross one another. The inner layer has fibers arranged transversely and the fibers extend from an edge of one of the openings to an edge of the other opening. The top layer which is spiralled has the fibers extending at right angles to the transverse fibers. Such a construction provides added strength to the completed tire.

The improved balloon-tire wheel hereinbefore described has the advantage that no independent inner tube is required. Furthermore, fitting tools or levers such as usually employed with pneumatic tires are unnecessary for the mounting of the tire and the tire is less liable to puncture as it accommodates a large quantity of air and thus requires inflation only to a relatively low pressure so that greater serviceability is obtained than with the known form of pneumatic tires.

Furthermore the construction of the improved wheel is simple and comparatively inexpensive as the complicated moulds and machinery required for the production of pneumatic tires of the usual kind are unnecessary.

It will be understood that the invention is not limited to the particular embodiment hereinbefore described and that the detailed construction may be varied within the scope of the invention.

Having now particularly described and ascertained the nature of the said invention and in what manner the same is to be performed, I declare that what I claim is:

1. A pneumatic balloon-tire wheel for vehicles and the like comprising a hollow balloon of substantially disc-like formation having two opposite central apertures therein, said balloon comprising layers of fibrous material composed of a fiber strand extending in increasing spirals from the central apertures, and air sealing means on the internal walls of said balloon.

2. A pneumatic balloon-tire wheel as claimed in claim 1 and wherein successive layers of said fibers are disposed to cross.

3. In a pneumatic balloon-tire wheel as claimed in claim 2, sealing means for said balloon inserted through the oppositely disposed central apertures therein pressing the inner edges of said balloon together and clamping them therebetween and shaping discs coacting with said sealing means to shape the outer part of the tire to a substantially tubular form.

4. A pneumatic balloon-tire wheel as claimed in claim 3, said balloon being externally covered with a coating of rubber material and having a thickened reinforcement layer of rubber at the tread portion thereof.

FRANCISCO GONZALEZ CUESTA.

REFERENCES CITED

The following references are of record in the file of this patent:

UNITED STATES PATENTS

| Number | Name | Date |
|---|---|---|
| 476,764 | Hall | June 7, 1892 |
| 799,374 | Gray | Sept. 12, 1905 |
| 1,979,371 | Diack | Nov. 6, 1934 |
| 2,242,915 | Koski | May 20, 1941 |